United States Patent
Chen et al.

(10) Patent No.: US 9,464,909 B2
(45) Date of Patent: Oct. 11, 2016

(54) APPARATUS, SYSTEM AND METHOD FOR CLUSTERING POINTS OF INTEREST IN A NAVIGATION SYSTEM

(71) Applicants: VOLKSWAGEN AG, Wolfsburg (DE); AUDI AG, Ingolstadt (DE)

(72) Inventors: Henry Chen, Los Altos, CA (US); Peter Oel, Ruhen (DE); Chuhee Lee, Belmont, CA (US); Sagnik Dhar, Sunnyvale, CA (US); Hsien-Hsun Wu, Palo Alto, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 0 days.

(21) Appl. No.: 14/579,074

(22) Filed: Dec. 22, 2014

(65) Prior Publication Data

US 2016/0069699 A1    Mar. 10, 2016

Related U.S. Application Data

(63) Continuation-in-part of application No. 14/482,630, filed on Sep. 10, 2014.

(51) Int. Cl.
*G01C 21/36* (2006.01)

(52) U.S. Cl.
CPC ....... *G01C 21/3605* (2013.01); *G01C 21/3682* (2013.01)

(58) Field of Classification Search
CPC .............. G01C 21/3476; G01C 21/36; G01C 21/3605; G01C 21/3682
USPC ......................................................... 701/426
See application file for complete search history.

(56) References Cited

U.S. PATENT DOCUMENTS

| | | |
|---|---|---|
| 6,542,812 B1 | 4/2003 | Obradovich et al. |
| 6,775,613 B2 | 8/2004 | Burt et al. |

(Continued)

FOREIGN PATENT DOCUMENTS

WO     2010040400 A1    4/2010

OTHER PUBLICATIONS

Extended European Search Report for European Patent Application No. EP 15 18 1929.9, dated Feb. 8, 2016.

*Primary Examiner* — Atul Trivedi

(74) *Attorney, Agent, or Firm* — Barnes & Thornburg LLP

(57) ABSTRACT

A navigation system, apparatus and method utilizing a processor and a sensor, operatively coupled to the processor to determine a location of the navigation system. A navigation input module is configured to receive destination data specifying a destination and a plurality of point-of-interest (POI) data from a user, where the navigation input module is further configured to receive a POI search area value defining an area of search for the POI data from potential route segments. The processor may utilize the POI search area value to search a plurality of areas along the potential route segments to identify at least some of the plurality of POI data that are in closest proximity to the destination, and wherein the processor may be further configured to cluster the identified POI data for simultaneous presentation on a navigational map.

20 Claims, 12 Drawing Sheets

(56) References Cited

U.S. PATENT DOCUMENTS

| | | | |
|---|---|---|---|
| 6,839,628 B1* | 1/2005 | Tu | G01C 21/3679 340/990 |
| 7,353,109 B2* | 4/2008 | Han | G01C 21/36 340/995.1 |
| 7,751,968 B2 | 7/2010 | Yamada et al. | |
| 8,239,130 B1* | 8/2012 | Upstill | G01C 21/3679 701/400 |
| 8,249,805 B2 | 8/2012 | de Silva et al. | |
| 8,566,029 B1* | 10/2013 | Lopatenko | G08G 1/0962 701/400 |
| 8,589,069 B1* | 11/2013 | Lehman | G01C 21/20 340/995.1 |
| 8,676,497 B2* | 3/2014 | Feng | G01C 21/20 701/426 |
| 8,990,008 B2* | 3/2015 | Voβen | G01C 21/3679 340/988 |
| 9,057,616 B1* | 6/2015 | Lopatenko | G08G 1/0962 |
| 9,080,890 B2* | 7/2015 | Svendsen | G01C 21/3611 |
| 9,087,412 B2* | 7/2015 | Fulks | G06T 11/60 |
| 9,146,118 B2* | 9/2015 | Liu | G01C 21/3682 |
| 9,146,129 B1* | 9/2015 | Furio | G01C 21/3682 |
| 9,234,765 B1* | 1/2016 | Padovitz | G01C 21/20 |
| 2003/0033176 A1* | 2/2003 | Hancock | G01C 21/20 705/6 |
| 2004/0204821 A1* | 10/2004 | Tu | G01C 21/3679 701/527 |
| 2004/0260465 A1* | 12/2004 | Tu | G01C 21/3679 701/426 |
| 2006/0089788 A1 | 4/2006 | Laverty | |
| 2009/0005987 A1* | 1/2009 | Vengroff | G06Q 30/02 701/300 |
| 2009/0234572 A1* | 9/2009 | Matsuo | G01C 21/3679 701/533 |
| 2009/0276318 A1* | 11/2009 | Broadbent | G01C 21/00 705/14.64 |
| 2010/0305842 A1 | 12/2010 | Feng | |
| 2011/0106431 A1* | 5/2011 | Tomobe | G01C 21/32 701/533 |
| 2011/0238690 A1* | 9/2011 | Arrasvuori | G06F 3/04812 707/769 |
| 2012/0078504 A1* | 3/2012 | Zhou | G01C 21/3611 701/411 |
| 2012/0197696 A1 | 8/2012 | Beyeler et al. | |
| 2012/0259692 A1* | 10/2012 | Monteverde | G06Q 30/0224 705/14.25 |
| 2013/0332297 A1* | 12/2013 | Forutanpour | G01C 21/3461 705/26.1 |
| 2014/0032101 A1 | 1/2014 | Pandya et al. | |
| 2015/0066356 A1* | 3/2015 | Kirsch | G01C 21/3664 701/425 |
| 2016/0132513 A1* | 5/2016 | Lim | G06F 17/30241 707/724 |

* cited by examiner

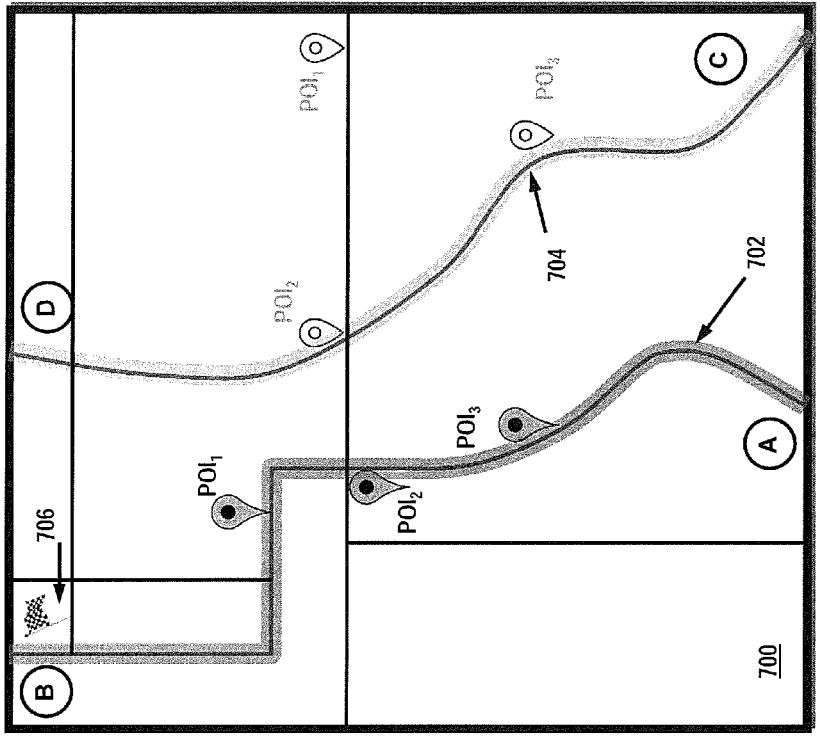
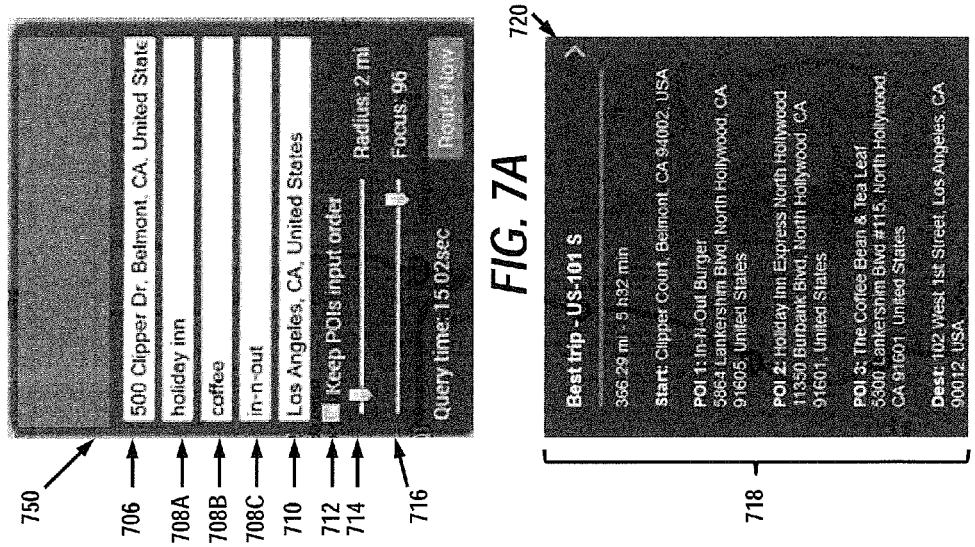
FIG. 7C
FIG. 7A
FIG. 7B

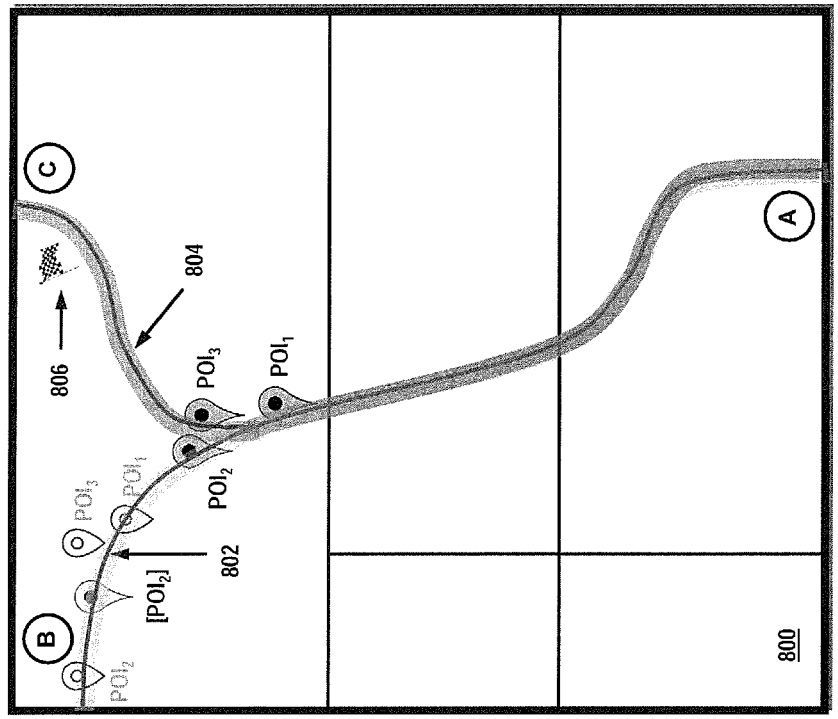
FIG. 8C
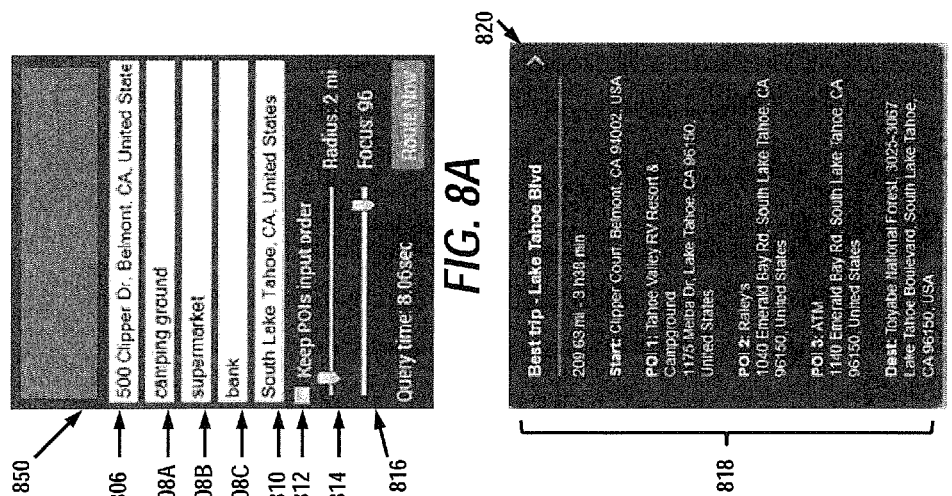
FIG. 8A
FIG. 8B

APPARATUS, SYSTEM AND METHOD FOR CLUSTERING POINTS OF INTEREST IN A NAVIGATION SYSTEM

RELATED APPLICATIONS

The present disclosure is a continuation in part of U.S. non-provisional patent application Ser. No. 14/482,630, to Chen et al., titled "Apparatus, System and Method for Clustering Points of Interest in a Navigation System," filed 10 Sep. 2014, the contents of which is incorporated by reference in its entirety herein.

BACKGROUND

The present disclosure is directed to navigation devices and systems. More specifically, the present disclosure is directed to navigational processing for efficiently identifying and/or clustering points of interest (POI) on a navigational map.

Navigation systems are electronic, processor-based systems that aid in navigation. Navigation systems may be configured to be entirely on board a vehicle or vessel, or they may be located elsewhere and communicate via radio or other signals with a vehicle or vessel, or they may use a combination of these methods. Navigation systems may also be configured within a portable device, such as a laptop, smart phone, tablet and the like. Navigation systems may be capable of containing maps, which may be displayed in human readable format via text or in a graphical format, determining a vehicle or vessel's location via sensors, maps, or information from external sources, providing suggested directions to a human in charge of a vehicle or vessel via text or speech, providing directions directly to an autonomous vehicle such as a robotic probe, providing information on nearby vehicles or vessels, or other hazards or obstacles, and providing information on traffic conditions and suggesting alternative directions.

In existing navigation systems, users are capable of searching for POIs. However, users cannot efficiently search for multiple POIs simultaneously using generic names (e.g., "gas station", "bank", "restaurant") and/or names specific to a generic category (e.g., "BP", "Bank of America", "TGI Fridays"). Furthermore, there are no existing systems that can intelligently cluster multiple POI results and process the results into an efficient routing for the user.

SUMMARY

Various apparatus, systems and methods are disclosed for processing navigational data such as POIs, which may be generically or specifically defined by the user, and clustering the data into groups in order to produce navigational routes that are optimized by speed and/or distance. Users may further be given the option to modify clustering results to provide further customization.

Under one exemplary embodiment, a navigation system is disclosed comprising a processor, a sensor, operatively coupled to the processor, the sensor being configured to determine a location of the navigation system, and a navigation input module, operatively coupled to the processor, wherein the navigation input module is configured to receive destination data specifying a destination and a plurality of point-of-interest (POI) data from a user, wherein the navigation input module is further configured to receive a POI search area value defining an area of search for the POI data from potential route segments. The processor may utilize the POI search area value to search a plurality of areas along the potential route segments to identify at least some of the plurality of POI data that are in closest proximity to the destination, and wherein the processor may be further configured to cluster the identified POI data for simultaneous presentation on a navigational map.

In other exemplary embodiments, the POI search area value may comprises a limited area of search from a route segment, wherein the limited area of search may comprise (i) one or more distances extending radially around a point on the route segment, or (ii) a radius of search extending radially around a point on the route segment. In other embodiments, the navigation system may be configured to search the plurality of areas along potential route segments by searching adjacent POI areas of search in one of an overlapping and non-overlapping manner. In still further embodiments, the processor may be configured to identify an exit along the potential route segment and search the identified exit using the POI search area value. The POI data may comprise generic POIs and specific POIs that are associated with one or more generic POIs, wherein the processor is configured to cluster at least one of a plurality of generic and specific POIs. In still further embodiments, the navigation input module may be configured to receive a POI search focus value for defining a focus area relative to the destination in which the processor searches the plurality of areas along the potential route segments. The processor may also be configured to dynamically expand or contract the area of search for the POI data in accordance with a delta that is added or subtracted to the POI search area value.

In another exemplary embodiment, a method is disclosed for searching and clustering points-of-interest (POI) in a navigation system, the method comprising the steps of determining a location of a navigation system in a navigation system sensor; receiving, in a navigation input module operatively coupled to a processor of the navigation system, destination data specifying a destination and a plurality of point-of-interest (POI) data from a user; receiving, in the navigation input module, a POI search area value defining an area of search for the POI data along potential route segments; searching a plurality of areas along the potential route segments utilizing the POI search area value in the navigation system to identify at least some of the plurality of POI data that are in closest proximity to the destination; and clustering the identified POI data for simultaneous presentation on a navigational map.

BRIEF DESCRIPTION OF THE FIGURES

The present invention is illustrated by way of example and not limitation in the figures of the accompanying drawings, in which like references indicate similar elements and in which:

FIGS. 7A-7B illustrate an embodiment for entering start navigation data, end navigation data and a plurality of POIs utilizing a radius and focus tool to cluster and textually present POIs;

FIG. 7C illustrate a navigational map under an embodiment that displays clustered POIs for a first navigational path and alternately clustered POIs for a second navigational path utilizing entered navigation data of the embodiment of FIG. 7A;

FIGS. 8A-8B illustrate another embodiment for entering start navigation data, end navigation data and a plurality of POIs utilizing a radius and focus tool to cluster and textually present POIs;

FIG. 8C illustrate another navigational map under an embodiment that displays clustered POIs for a first navigational path and alternately clustered POIs for a second navigational path utilizing entered navigation data of the embodiment of FIG. 8A;

DETAILED DESCRIPTION

Various embodiments will be described herein below with reference to the accompanying drawings. In the following description, well-known functions or constructions are not described in detail since they may obscure the invention in unnecessary detail.

It will be understood that the term "module" as used herein does not limit the functionality to particular physical modules, but may include any number of software and/or hardware components. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via C, C++, C#, Java, Actionscript, Objective-C, Javascript, CSS, XML, etc.).

Figure 1:
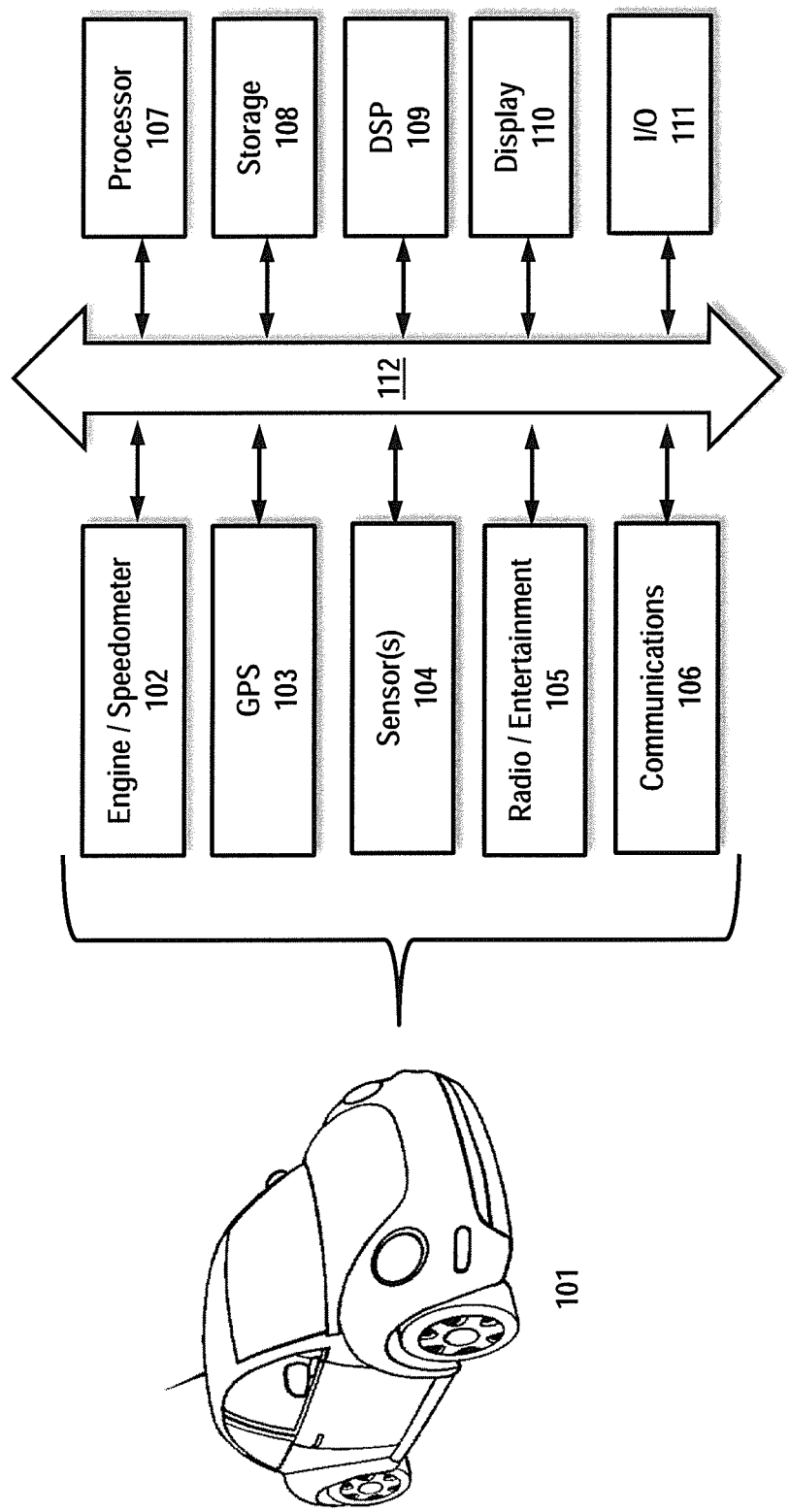
FIG. 1 illustrates an exemplary vehicle system block diagram showing multiple components and modules, together with a navigational system under one embodiment.

Turning to FIG. 1, the drawing illustrates an exemplary vehicle system 101 comprising various vehicle electronics modules, subsystems and/or components. Engine/transmission module 102 is configured to process and provide vehicle engine and transmission characteristic or parameter data, and may comprise an engine control unit (ECU), and a transmission control. For a diesel engine, module 102 may provide data relating to fuel injection rate, emission control, NOx control, regeneration of oxidation catalytic converter, turbocharger control, cooling system control, and throttle control, among others. For a gasoline engine, module 102 may provide data relating to lambda control, on-board diagnostics, cooling system control, ignition system control, lubrication system control, fuel injection rate control, throttle control, and others. Transmission characteristic data may comprise information relating to the transmission system and the shifting of the gears, torque, and use of the clutch. Under one embodiment, an engine control unit and transmission control may exchange messages, sensor signals and control signals.

Global positioning system (GPS) module 103 provides navigation processing (see FIG. 4) and location data for vehicle 10. Sensors 104 provides sensor data which may comprise data relating to vehicle characteristic and/or parameter data (e.g., from 102), and may also provide environmental data pertaining to the vehicle, its interior and/or surroundings, such as temperature, humidity and the like. Radio/entertainment module 105 may provide data relating to audio/video media being played in vehicle 101. Module 105 may be integrated and/or communicatively coupled to an entertainment unit configured to play AM/FM radio, satellite radio, compact disks, DVDs, digital media, streaming media and the like. Communications module 106 allows any of the modules to communicate with each other and/or external devices via a wired connection or wireless protocol, such as Wi-Fi, Bluetooth, NFC, etc. In one embodiment, modules 102-106 may be communicatively coupled to bus 112 for certain communication and data exchange purposes.

Vehicle 101 may further comprise a main processor 107 that centrally processes and controls data communication throughout the system of FIG. 1. Storage 108 may be configured to store data, software, media, files and the like. Digital signal processor (DSP) 109 may comprise a processor separate from main processor 107, or may be integrated within processor 107. Generally speaking, DSP 109 may be configured to take signals, such as voice, audio, video, temperature, pressure, position, etc. that have been digitized and then process them as needed. Display 110 may be configured to provide visual (as well as audio) indicial from any module in FIG. 1, and may be a configured as a LCD, LED, OLED, or any other suitable display. Display may also be configured with audio speakers for providing audio output. Input/output module 111 is configured to provide data input and outputs to/from other peripheral devices, such as key fobs, device controllers and the like. As discussed above, modules 107-111 may be communicatively coupled to data bus 112 for transmitting/receiving data and information from other modules.

Figure 2:
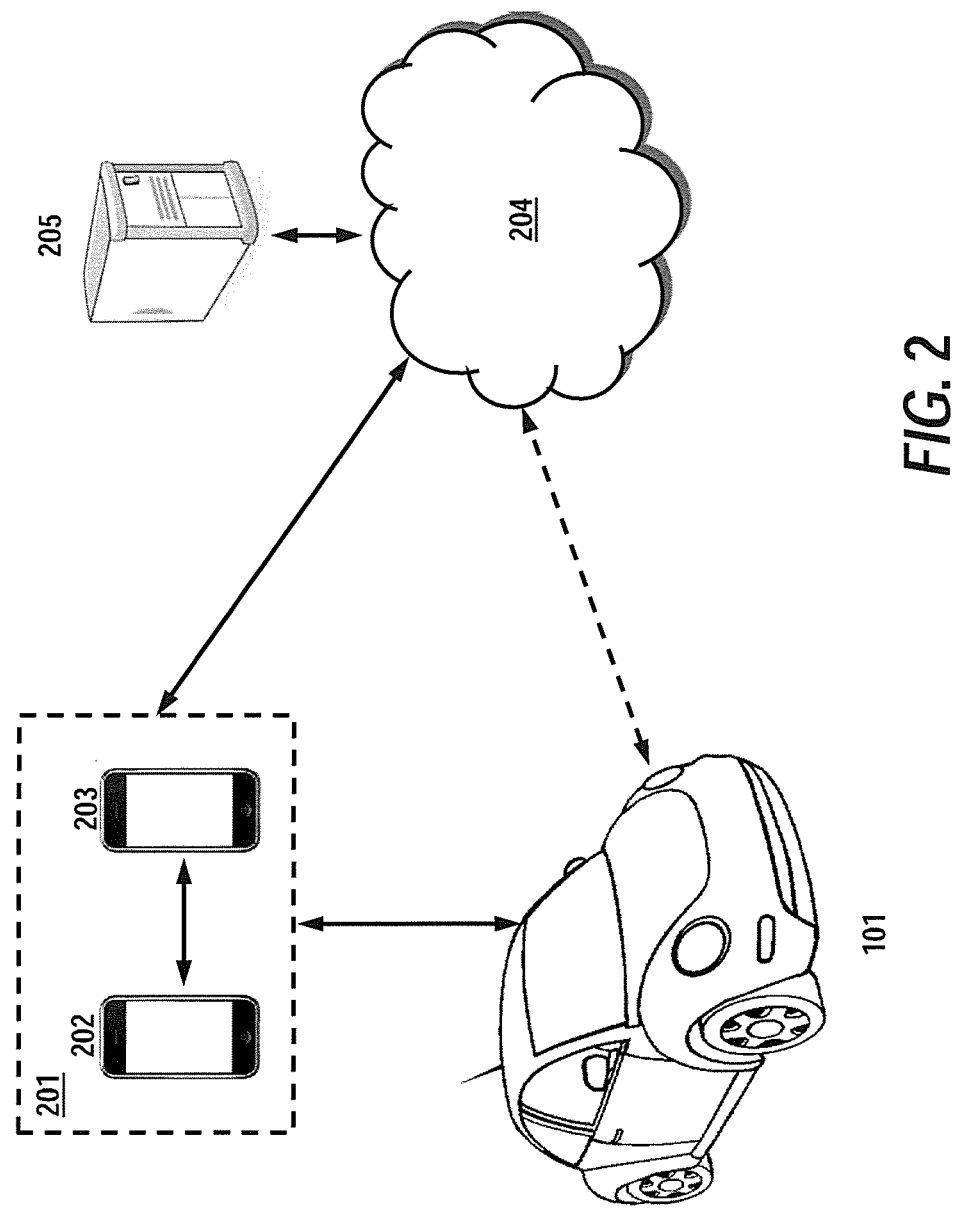
FIG. 2 is an exemplary block diagram illustrating the vehicle of FIG. 1 communicatively coupled to one or more portable devices and a computer network under one embodiment.

Turning to FIG. 2, an exemplary embodiment is illustrated, where a vehicle 101 (see FIG. 1), is paired with one or more devices 201 (202, 203) which may be registered to one or more users. Devices 201 may be registered with vehicle 101 using Bluetooth pairing or using WiFi or NFC registration, as is known in the art. Preferably, device 201 registrations are stored (e.g., 108) at the vehicle according to a device ID or SIM ID, and may further include a device user profile associated with each ID that may include demographic data, user interests, and/or user device/vehicle history. In the embodiment of FIG. 2, devices 202, 203 may configured to communicate navigational data with vehicle 101, and may be further configured to communicate with each other. Portable devices 201 are also configured to communicate with wireless network 204 in order to send/receive data from a central server 205. Similarly, in one embodiment, vehicle 101 may also be configured to communicate with network 204. Server 205 may be also configured to perform back-end processing for devices 201 and vehicle 101, and further communicate with other remote servers for additional functionalities, such as supplementary map data, navigational data, and the like.

Figure 3:
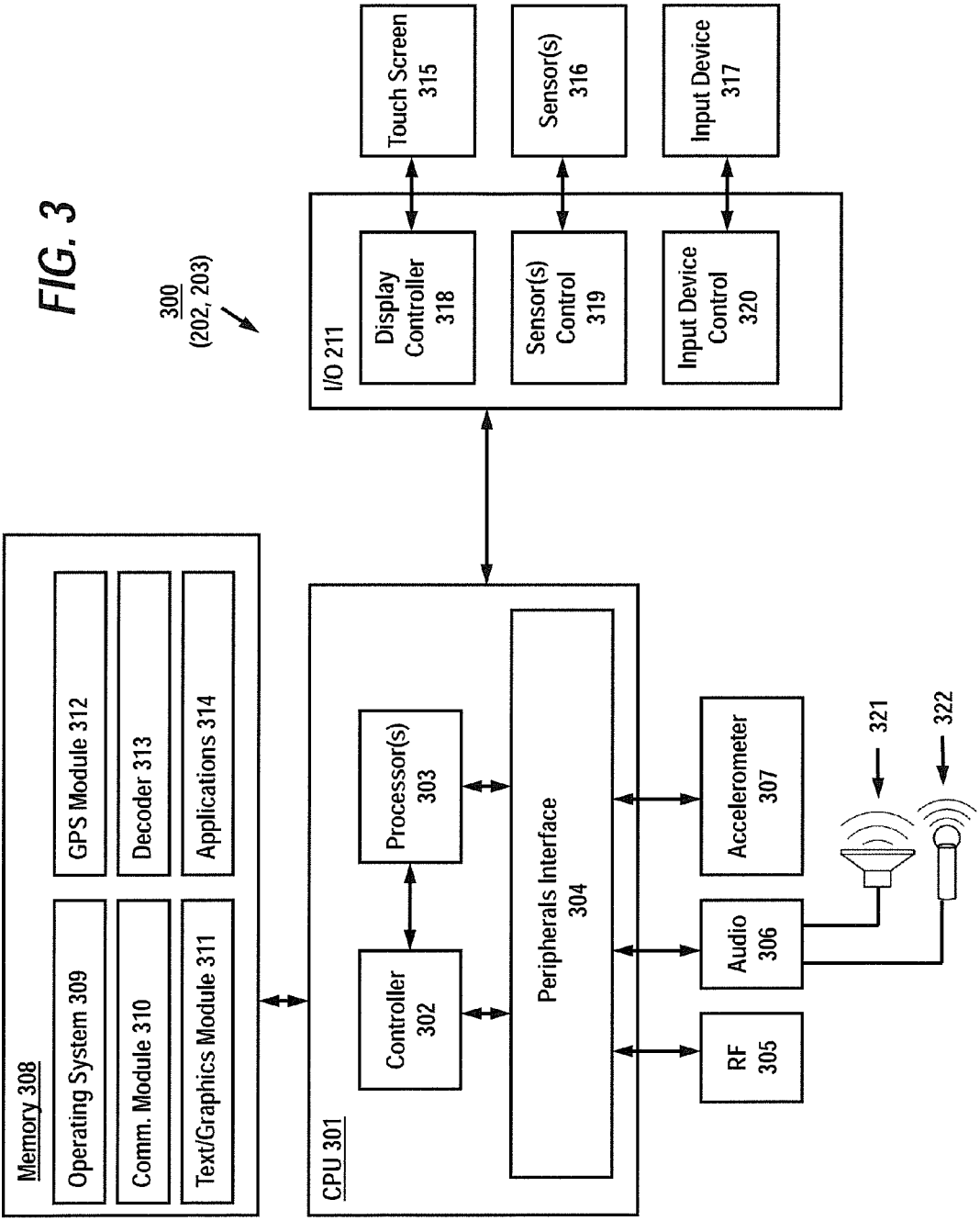
FIG. 3 is an exemplary block diagram illustrating components and modules of a portable device, configured for navigation and navigational processing and further configured to operate in the exemplary system of FIG. 2 under one embodiment.

FIG. 3 is an exemplary embodiment of a portable computing device 300 (such as devices 202, 203 of FIG. 2), and may be a smart phone, tablet computer, laptop or the like. Device 300 may include a central processing unit (CPU) 301 (which may include one or more computer readable storage mediums), a memory controller 302, one or more processors 303, a peripherals interface 304, RF circuitry 305, audio circuitry 306, a speaker 321, a microphone 322, and an input/output (I/O) subsystem 311 having display controller 318, control circuitry for one or more sensors 319 and input device control 320. These components may communicate over one or more communication buses or signal lines in device 300. It should be appreciated that device 300 is only one example of a portable multifunction device 300, and that device 300 may have more or fewer components than shown, may combine two or more components, or a may have a different configuration or arrangement of the components. The various components shown in FIG. 3 may be implemented in hardware or a combination of hardware and software, including one or more signal processing and/or application specific integrated circuits.

Memory (or storage) 308 may include high-speed random access memory (RAM) and may also include non-volatile memory, such as one or more magnetic disk storage devices, flash memory devices, or other non-volatile solid-state memory devices. Access to memory 308 by other components of the device 300, such as processor 303, and peripherals interface 304, may be controlled by the memory controller 302. Peripherals interface 304 couples the input and output peripherals of the device to the processor 303 and memory 308. The one or more processors 303 run or execute various software programs and/or sets of instructions stored in memory 308 to perform various functions for the device 300 and to process data. In some embodiments, the peripherals interface 304, processor(s) 303, decoder 313 and memory controller 302 may be implemented on a single chip, such as a chip 301. In other embodiments, they may be implemented on separate chips.

RF (radio frequency) circuitry 305 receives and sends RF signals, also known as electromagnetic signals. The RF circuitry 305 converts electrical signals to/from electromagnetic signals and communicates with communications networks and other communications devices via the electromagnetic signals. The RF circuitry 305 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 305 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

Audio circuitry 306, speaker 320, and microphone 321 provide an audio interface between a user and the device 300. Audio circuitry 306 may receive audio data from the peripherals interface 204, converts the audio data to an electrical signal, and transmits the electrical signal to speaker 321. The speaker 321 converts the electrical signal to human-audible sound waves. Audio circuitry 306 also receives electrical signals converted by the microphone 321 from sound waves, which may include encoded audio, described above. The audio circuitry 306 converts the electrical signal to audio data and transmits the audio data to the peripherals interface 304 for processing. Audio data may be retrieved from and/or transmitted to memory 308 and/or the RF circuitry 305 by peripherals interface 304. In some embodiments, audio circuitry 306 also includes a headset jack for providing an interface between the audio circuitry 206 and removable audio input/output peripherals, such as output-only headphones or a headset with both output (e.g., a headphone for one or both ears) and input (e.g., a microphone).

I/O subsystem 311 couples input/output peripherals on the device 300, such as touch screen 315 and other input/control devices 317, to the peripherals interface 304. The I/O subsystem 311 may include a display controller 318 and one or more input controllers 320 for other input or control devices. The one or more input controllers 320 receive/send electrical signals from/to other input or control devices 317. The other input/control devices 317 may include physical buttons (e.g., push buttons, rocker buttons, etc.), dials, slider switches, joysticks, click wheels, and so forth. In some alternate embodiments, input controller(s) 320 may be coupled to any (or none) of the following: a keyboard, infrared port, USB port, and a pointer device such as a mouse, an up/down button for volume control of the speaker 321 and/or the microphone 322. Touch screen 315 may also be used to implement virtual or soft buttons and one or more soft keyboards.

Touch screen 315 provides an input interface and an output interface between the device and a user. Display controller 318 receives and/or sends electrical signals from/to the touch screen 315. Touch screen 315 displays visual output to the user. The visual output may include graphics, text, icons, video, and any combination thereof. In some embodiments, some or all of the visual output may correspond to user-interface objects. Touch screen 315 has a touch-sensitive surface, sensor or set of sensors that accepts input from the user based on haptic and/or tactile contact. Touch screen 315 and display controller 318 (along with any associated modules and/or sets of instructions in memory 308) detect contact (and any movement or breaking of the contact) on the touch screen 315 and converts the detected contact into interaction with user-interface objects (e.g., one or more soft keys, icons, web pages or images) that are displayed on the touch screen. In an exemplary embodiment, a point of contact between a touch screen 315 and the user corresponds to a finger of the user. Touch screen 215 may use LCD (liquid crystal display) technology, or LPD (light emitting polymer display) technology, although other display technologies may be used in other embodiments. Touch screen 315 and display controller 318 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 315.

Device 300 may also include one or more sensors 316 such as optical sensors that comprise charge-coupled device (CCD) or complementary metal-oxide semiconductor (CMOS) phototransistors. The optical sensor may capture still images or video, where the sensor is operated in conjunction with touch screen display 315. Device 300 may also include one or more accelerometers 207, which may be operatively coupled to peripherals interface 304. Alternately, the accelerometer 207 may be coupled to an input controller 314 in the I/O subsystem 311. The accelerometer is preferably configured to output accelerometer data in the x, y, and z axes.

In some illustrative embodiments, the software components stored in memory 308 may include an operating system 309, a communication module 310, a text/graphics module 311, a Global Positioning System (GPS) module 312, audio decoder 313 and applications 314. Operating system 309 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components. Communication module 310 facilitates communication with other devices over one or more external ports and also includes various software components for handling data received by the RF circuitry 305. An external port (e.g., Universal Serial Bus (USB), Firewire, etc.) may be provided and adapted for coupling directly to other devices or indirectly over a network (e.g., the Internet, wireless LAN, etc.

Text/graphics module 311 includes various known software components for rendering and displaying graphics on the touch screen 315, including components for changing the intensity of graphics that are displayed. As used herein, the term "graphics" includes any object that can be displayed to a user, including without limitation text, web pages, icons (such as user-interface objects including soft keys), digital images, videos, animations and the like. Additionally, soft keyboards may be provided for entering text in various applications requiring text input. GPS module 312 determines the location of the device and provides this information for use in various applications. Applications 314 may include various modules, including navigation software, mapping, address books/contact list, email, instant messaging, and the like. Navigation applications may be natively executed and operated on device 300, allowing users to enter and process navigational and/or mapping data, as will be described in greater detail below.

Figure 4:
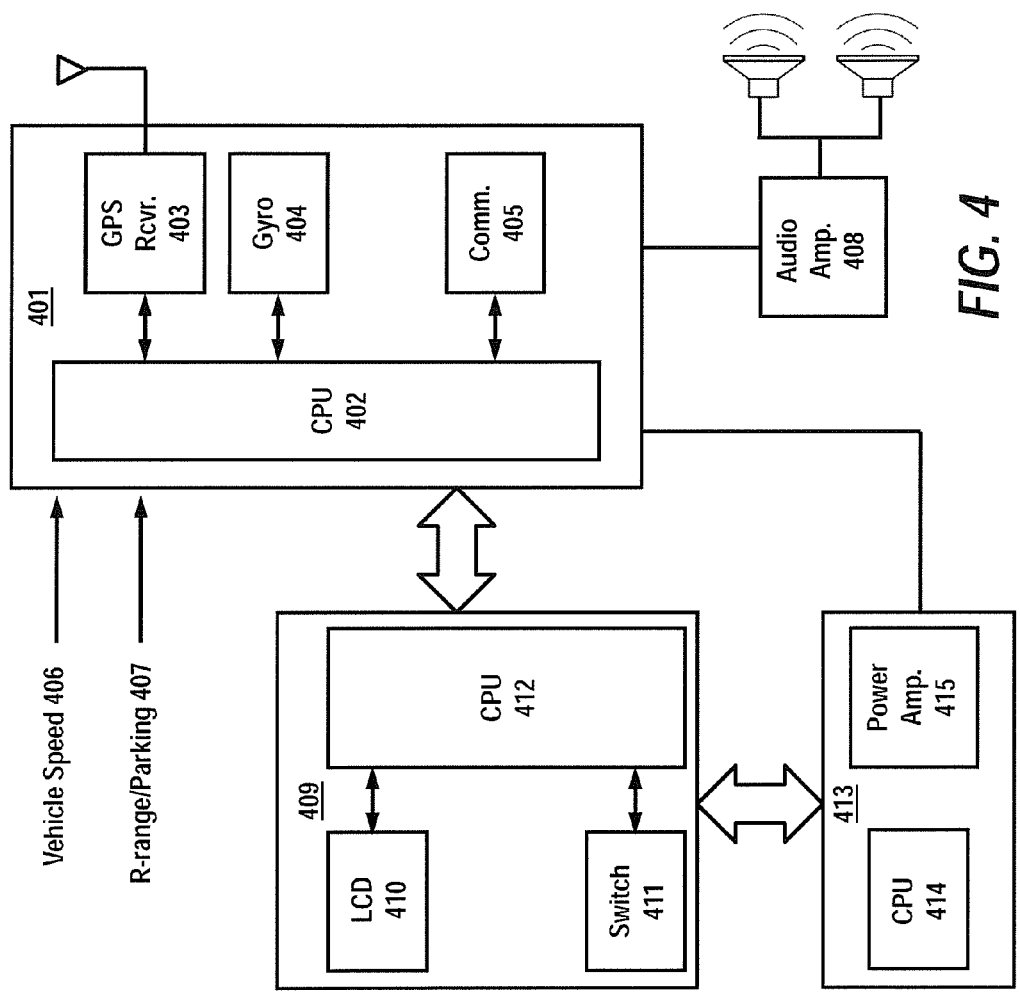
FIG. 4 is an exemplary bock diagram of a vehicle navigational system suitable for use in the exemplary system of FIG. 1 under one embodiment.

Turning now to FIG. 4, an exemplary vehicle navigation system is disclosed comprising a car navigation unit 401 comprising a CPU 402, GPS receiver 403 and gyroscope 404. Additionally, navigation unit 401 may include communications 405, allowing navigation unit 401 to communicate with portable devices, such as device 300, discussed above. Navigation unit may receive vehicle speed signal 406 and R-range/parking signal 407 to track vehicle movement and status. Navigation unit 401 utilizes GPS receiver 403 to acquire position data to locate the user on a road in the unit's map database. Using a road database, unit 401 can give directions to other locations along roads also in its database. Dead reckoning using distance data from sensors attached to the drivetrain, gyroscope 405 and an accelerometer (not shown) can be used for greater reliability, as GPS signal loss and/or multipath can occur due to urban canyons or tunnels.

The road database for navigation unit 401 may be a vector map containing some area of interest. Street names or numbers and house numbers may be encoded as geographic coordinates so that a user can find some desired destination by street address or, as will be discussed in greater detail below, by a generic or specific name. Points of interest (waypoints) may also be stored with their geographic coordinates. Point of interest specialties include speed cameras, fuel stations, public parking, and so forth. Contents can be produced by the user base as a vehicle drive along existing streets (cellular, Wi-Fi) and communicating via the internet, yielding an up-to-date map. Navigation mapping formats may include geographic data files (GDF), and may also include other formats, such as CARiN, SDAL and NDS PSF.

Navigation unit 401 may be further coupled to LCD unit 409 and audio unit 413, where LCD unit 409 may comprise LCD screen 410, CPU 412 and on/off switch 411. Audio unit 413 may comprise CPU 414 and power amplifier 415. Output of audio unit 413 may be forwarded to audio amplifier 408 for output to a user.

Figure 5:
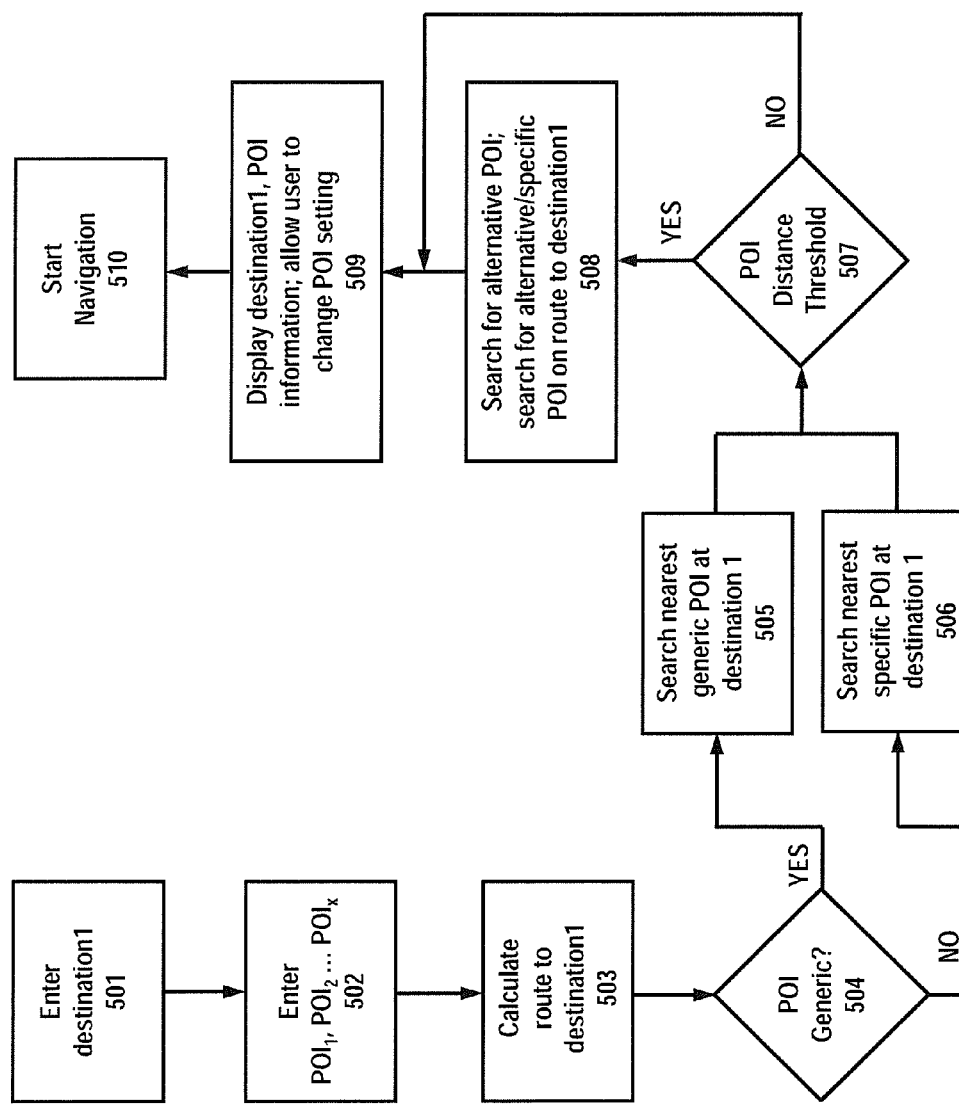
FIG. 5 is an exemplary flow diagram illustrating a process for clustering points of interest (POI) under an exemplary embodiment.

Turning to FIG. 5, an exemplary process is shown for clustering POIs processed for a user. In one embodiment, the process of FIG. 5 may be performed on a portable device, such as the one illustrated in FIG. 3. In another embodiment, the process of FIG. 5 may be performed on a navigation unit, such as the one illustrated in FIG. 4. In still a further embodiment, the process of FIG. 5 may be shared between a portable device and a navigation unit. Such an embodiment is particularly advantageous in that computationally expensive processes may be performed on the portable device.

In step 501, a user enters a destination (destination1) into a navigation system, and/or a navigation application executed on a portable device. In step 502, a user may enter multiple POIs ($POI_1$, $POI_2$ . . . $POI_x$) into the navigation application. In step 503, the navigation application calculates a route to the destination (e.g., utilizing shortest-path algorithms, threshold based iterative algorithms, NP-Hard, polynomial time, k Best Connected Trajectories (k-BCT), greedy algorithms and the like) and may perform further processing to determine locations of POIs nearest the destination. In step 504, the navigation application determines if the POI entries are generic (e.g., "gas station", "bank", "restaurant") and/or specific to a generic category (e.g., "BP", "Bank of America", "TGI Fridays"). Such a determination may be made by matching entries to a POI database and processing to establish categories. If an entry is generic (YES), the navigation processor looks for all generic POIs near the destination. If an entry is specific (NO), the navigation processor similarly looks for all specific POIs near the destination. The clustered POIs are then processed in 507 to see if their distance to the destination exceeds a given threshold (e.g., 5 miles). If the destination(s) exceed the distance threshold (YES), the navigation application searches for alternative POIs and may search for alternative POIs on route to the destination. In this embodiment, POIs may be separately clustered based on a search result and proximity. If the destination(s) do not exceed the distance threshold (NO), the processor causes screen or display to show the destination, together with the POI and/or clustered POI information in 509. Depending on the result, a user may be given further options to change the POI setting to better match a user preference. Afterwards, navigation 510 may be initiated in which the most efficient (or preferred efficient) route to the destination, together with the clustered POIs, is executed.

Figure 6:
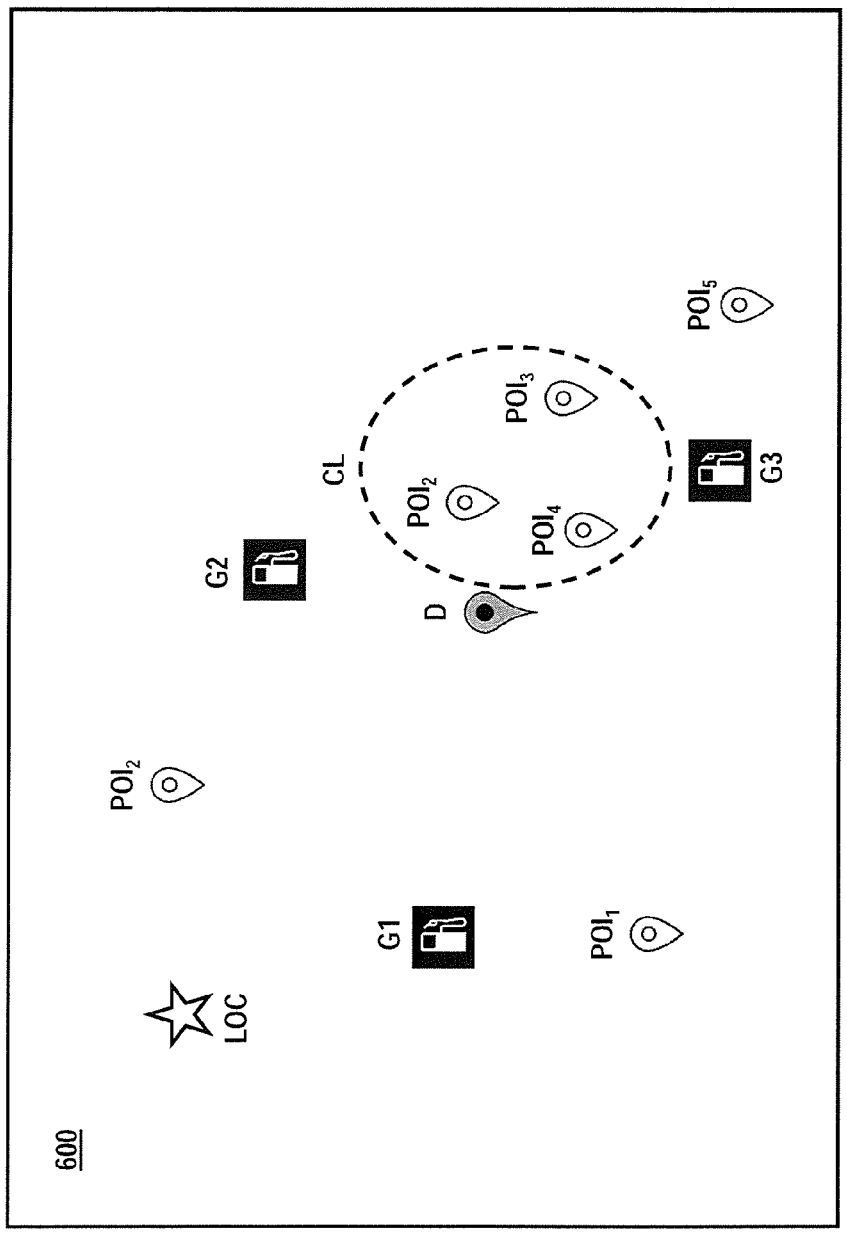
FIG. 6 illustrates an exemplary map display showing multiple POIs, along with a clustered POI and supplementary related POIs under one exemplary embodiment.

FIG. 6 illustrates an exemplary screen result based on processing illustrated in the example of FIG. 5. Here a user enters destination (D) and POI data from an originating location (LOC). After entering one or more generic and/or specific POIs, the processor generates a plurality of POI information ($POI_1$-$POI_6$) relating to the destination area (D). After engaging in proximity processing the POIs deemed to be in closest proximity, or containing the most efficient route ($POI_2$-$POI_4$), are clustered (CL) as shown in the figure. After the cluster CL is presented and approved by the user, the navigation application provides routing information to the user to provide an efficient route for the destination (D) and POIs ($POI_2$-$POI_4$). In addition, the navigation application may further provide supplementary POI information relating to the optimized route, such as gas stations (G1-G3) along the route.

As can be appreciated by those skilled in the art, the present disclosure provides a POI clustering features that provides various advantages. In one embodiment, the navigation may be enabled by a companion iOS or Android app that would allow the user to enter the list of POIs desired. Leveraging the computational power of the mobile devices, the app may calculate the most convenient and efficient route to allow the user to stop by all the POIs. The route may also be communicated to a vehicle's head unit automatically in one embodiment. On a vehicle side, a navigation system may display the route to the user, monitor the vehicle's fuel level, and when applicable, notify driver to a nearby, on the route, gas station for refueling.

The user may enter a destination and in an additional field provide entries such as "bank, pharmacy, Wal-Mart" in the navigation system of the vehicle. The navigation system may present to the user at least one suggestion of a route to the entered destination and, starting from the destination, an optimized route to the desired POIs. If the user provided generic names, like "bank" or "pharmacy", the navigation system will provide the nearest bank and pharmacy at the destination independent of the brand or name of the corresponding POI. If the user provided a specific name, like "Bank of America", "CWS Pharmacy" and "Wal-mart", the navigation system will search for the specific POIs. If the distance or time to a specific POI exceeds a (user definable) first threshold, the navigation system additionally suggests an alternative POI, if possible, with the possible time or distance to travel reduction. In one example, the navigation system may provide "Well Fargo instead of Bank of America: −7 miles; Target instead of Walmart: −12 miles". If the user would choose "Well Fargo instead of Bank of America", the alternative for "Target instead of Walmart" would be recalculated, because the route was changed and "Target instead of Walmart" might or might not be an economic alternative anymore.

In one embodiment, a user may define in settings that a search for "bank" always searches for a specific bank (e.g. Bank of America) or gas always searches for "BP". If one of the POIs would exceed a second threshold, the navigation would search for an economic route that would include a stop along the main route to the destination. The system could, for example prompt the user: "From <destination1> the nearest Walmart is 35 miles away, do you want to stop over in <destination2>; (+4.3 miles) instead? YES/NO". In another setting option, the user can define that the navigation system will always first search for economic stopovers along the main route to the destination to visit the desired POIs before searching the POIs at the destination entered.

Another example could be as a user is planning his weekend, he knows he needs to visit a friend at a nearby town. He also knows he still has to do his weekend shopping. In this clustering algorithm example, the user may be allowed to input a destination at his friend's house. From that point, the user can enter several POIs such as Target, Walmart, Costco, Bank, and a coffee shop to enjoy afternoon time with his friend. The algorithm will then automatically search for a cluster nearby the friend's house which will include all the stores that the user can easily reach without driving around the town too much.

This clustering algorithm can also work for locations near a current location, near current route, or near a destination as already described above. Once the user finds the cluster of shops that he likes to visit over the weekend, he could also set other parameters such as departure time, arrival time. This way, the clustering algorithm can calculate the most optimal route for the user based on current traffic or future traffic prediction. The algorithm can also rearrange the orders of the shops to attend to make sure that the user doesn't go to a store before its opening time. Furthermore, the information regarding these clusters of shops will also be available for the user. These can include, store opening times, reviews from Yelp or other sources, and reservation availability.

Turning to FIG. 7A, an illustrative embodiment is shown for a navigation data entry module 750 for allowing a user to enter a starting navigation point 706, a destination navigation point 710, and a plurality of POI entries (708A-708C). Data entry module 750 may be incorporate as an executable module of CPU 402 of the navigation system of FIG. 3, and/or CPU 301 of the portable device of FIG. 2. In should be understood by those skilled in the art that, while only three POI entries are shown, any number of POI entries may be provided for user entry, depending on the processing power and capability of the computing device hosting the navigation data entry module 750. In the illustrative embodiment, an option may be provided in navigation data entry module portion 712 to allow a user to keep POI entries in the order they are inputted in navigation data entry module 750. Under other embodiments, previous POI data entries may be stored and automatically loaded into POI entry portion (708A-708C) upon the occurrence of an event, such as starting a vehicle or turning on a device. In other embodiments, multiple POI data entries may be stored and grouped together and offered for selection in navigation data entry module 750. Users may be provided with additional data entry portions of data entry module 750 to name grouped POI data entries for convenient retrieval (e.g., "Work", "Joe's House", etc.).

Navigation data entry module 750 may further include a POI search area adjustment tool 714, which, in the illustrative embodiment is shown as a POI radius adjustment tool. The POI search area may be adjusted in the example by sliding the bar of search area adjustment tool 714 left or right to respectively decrease or increase the search area. Thus, if the search area adjustment tool 714 is positioned towards the left as shown in the illustrative figure, the POI search area will be limited, for example, to 2 miles from a given route. If the search area adjustment tool is positioned towards the right, the POI search area may be expanded to a larger area (e.g., 20 miles). It should be understood by those skilled in the art that search area adjustment tool 714 may be embodied as any of a multitude of tool configurations such as a vertical slide bar, dial or wheel, and may also include a manual data entry portion to allow users to manually enter (e.g., via a keypad or a virtual keyboard) a value or number for a search area. Furthermore, while a radius value is disclosed for the search area, it should be appreciated that any search area radially extending around a point on a route segment, in uniform or non-uniform lengths may be used to define other geometric values, such as a square area, and are equally applicable in the present disclosure.

Navigation data entry module 750 may further include a POI search focus tool 716, which allows users to specify an area along the navigation route in which one or more POI searches, specified by the area set in the POI search area adjustment tool 714, are conducted. The search focus area may be adjusted in the example by sliding the bar of POI search focus tool 716 left or right to respectively indicate a focus area that is closer to the starting navigation point (left) or the destination navigation point (right). Thus, if the POI search focus tool 716 is positioned towards the right as shown in the illustrative figure, the POI search area focus will be towards the end (96%) of a calculated route (i.e., near the destination). If the search area adjustment tool is positioned towards the left, the POI search area focus will be towards the beginning of a given route (i.e., near the starting navigation point).

Similar to the POI search area adjustment tool 714, it should be understood by those skilled in the art that the POI search focus tool 716 may be embodied as any of a multitude of tool configurations such as a vertical slide bar, dial or wheel, and may also include a manual data entry portion to allow users to manually enter (e.g., via a keypad or a virtual keyboard) a value or number for a search focus area. Furthermore, while a value indicating a percentage of a navigation route is disclosed for the search focus, it should be appreciated that other values may be equally applicable in the present disclosure. In an illustrative embodiment, POI search focus tool 716 may be incorporated with the navigation software being executed by a processor (e.g., CPU 402 of car navigation unit 401, CPU 301 of portable device 202) to allow the navigation screen to display and scroll the navigational map area subject to the selected search focus area selection. In another illustrative embodiment, a time for processing POI queries ("Query time: 15.02 sec") may be provided to a user to provide an indication of the complexity of the POI cluster search.

Turning now to FIG. 7B, after a user has entered the necessary data into navigation data entry module 750, the navigation system and/or associated device (e.g., portable device 202) may provide a textual display 718 of the best route and clustered POIs determined from the entry. Furthermore, a toggle button 720 may be provided to allow the user to toggle through navigation and/or POI choices. FIG. 7C shows a simplified map display 700 illustrating a primary ("best") route 702 to destination 706 from point A to B, along with a secondary route 704 from points C to D under an embodiment. As can be seen, the primary route 702 may be highlighted to distinguish it from the secondary route 704. Similarly, the primary clustered POIs ($POI_1$, $POI_2$, $POI_3$) may be displayed using highlighted indicia (e.g., tabs, push-pins, flags, etc.), while the secondary clustered POIs are made less visible using transparent indicia, shading, coloring, etc. By simultaneously displaying the primary and secondary navigational and POI choices, users may advantageously be able to make last-minute adjustments to a primary navigation route. For example, if a user is traveling on route 702 and suddenly decides that a secondary POI destination is more desirable, the user may change the navigation POI cluster to select secondary route 704. In some embodiments, the user may make such a change using toggle button 820, or by selecting the secondary route or POI on the navigation display screen.

Turning to FIG. 8A, another illustrative embodiment is shown for a navigation data entry module 850, similar to the embodiment in FIG. 7A, for allowing a user to enter a starting navigation point 806, a destination navigation point 810, and a plurality of POI entries (808A-808C). In should be understood by those skilled in the art that, while only three POI entries are shown, any number of POI entries may be provided for user entry, depending on the processing power and capability of the computing device hosting the navigation data entry module 850. In the illustrative embodiment, an option may be provided in navigation data entry module portion 812 to allow a user to keep POI entries in the order they are inputted in navigation data entry module 850. Under other embodiments, previous POI data entries may be stored and automatically loaded into POI entry portion (808A-808C) upon the occurrence of an event, such as starting a vehicle or turning on a device. In other embodiments, multiple POI data entries may be stored and grouped together and offered for selection in navigation data entry module 750. Users may be provided with additional data entry portions of data entry module 750 to name grouped POI data entries for convenient retrieval (e.g., "Work", "Joe's House", etc.).

Navigation data entry module 850 may further include a POI search area adjustment tool 814, which, in the illustrative embodiment is shown as a POI radius adjustment tool. The POI search area may be adjusted in the example by sliding the bar of search area adjustment tool 814 left or right to respectively decrease or increase the search area, similar to the illustrative embodiment of FIG. 7A. Navigation data entry module 850 may further include a POI search focus tool 816, which allows users to specify an area along the navigation route in which one or more POI searches, specified by the area set in the POI search area adjustment tool 714, are conducted. The search focus area may be adjusted in the example by sliding the bar of POI search focus tool 716 left or right to respectively indicate a focus area that is closer to the starting navigation point (left) or the destination navigation point (right), similar to the illustrative embodiment of FIG. 7A. In an illustrative embodiment, POI search focus tool 816 may be incorporated with the navigation software being executed by a processor (e.g., CPU 402 of car navigation unit 401, CPU 301 of portable device 202) to allow the navigation screen to display and scroll the navigational map area subject to the selected search focus area selection. In another illustrative embodiment, a time for processing POI queries ("Query time: 8.06 sec") may be provided to a user to provide an indication of the complexity of the POI cluster search.

Turning now to FIG. 8B, after a user has entered the necessary data into navigation data entry module 850, the navigation system and/or associated device (e.g., portable device 202) may provide a textual display 818 of the best route and clustered POIs determined from the entry. Furthermore, a toggle button 820 may be provided to allow the user to toggle through navigation and/or POI choices. FIG. 7C shows a simplified map display 800 illustrating a primary ("best") route 804 to destination 806 from point A to C, along with a secondary route 704 from points A to B under an embodiment. As can be seen, the primary route 804 may be highlighted to distinguish it from the secondary route 802. Similarly, the primary clustered POIs ($POI_1$, $POI_2$, $POI_3$) may be displayed using highlighted indicia (e.g., tabs, push-pins, flags, etc.), while the secondary clustered POIs are made less visible using transparent indicia, shading, coloring, etc.

In the embodiment of FIG. 8B, an alternate primary POI "[$POI_2$]" may also be displayed in a semi-highlighted manner. Alternate primary POIs may be incorporated as part of a primary POI cluster to advantageously provide additional options for POI navigation. As mentioned above, data concerning POIs and user preferences may be stored to provide POIs that are suited for a specific user. In one example, a user may have a preference for a particular type or brand of POI that is available in a POI cluster, but is not part of an optimal distance calculation "[$POI_2$]". By providing the user-preferred POI as an option, the user may decide to sacrifice time and distance benefits of the initial POI calculation to select the preferred POI "[$POI_2$]". In another example, the hours of operation for primary $POI_2$ are known to the system, and the navigation calculations indicate that the user may arrive after closing time. By providing the using with alternate primary "[$POI_2$]", the user may immediately redirect the system to make "[$POI_2$]" a new primary POI if it becomes apparent that the user will not arrive in time.

Figure 9:
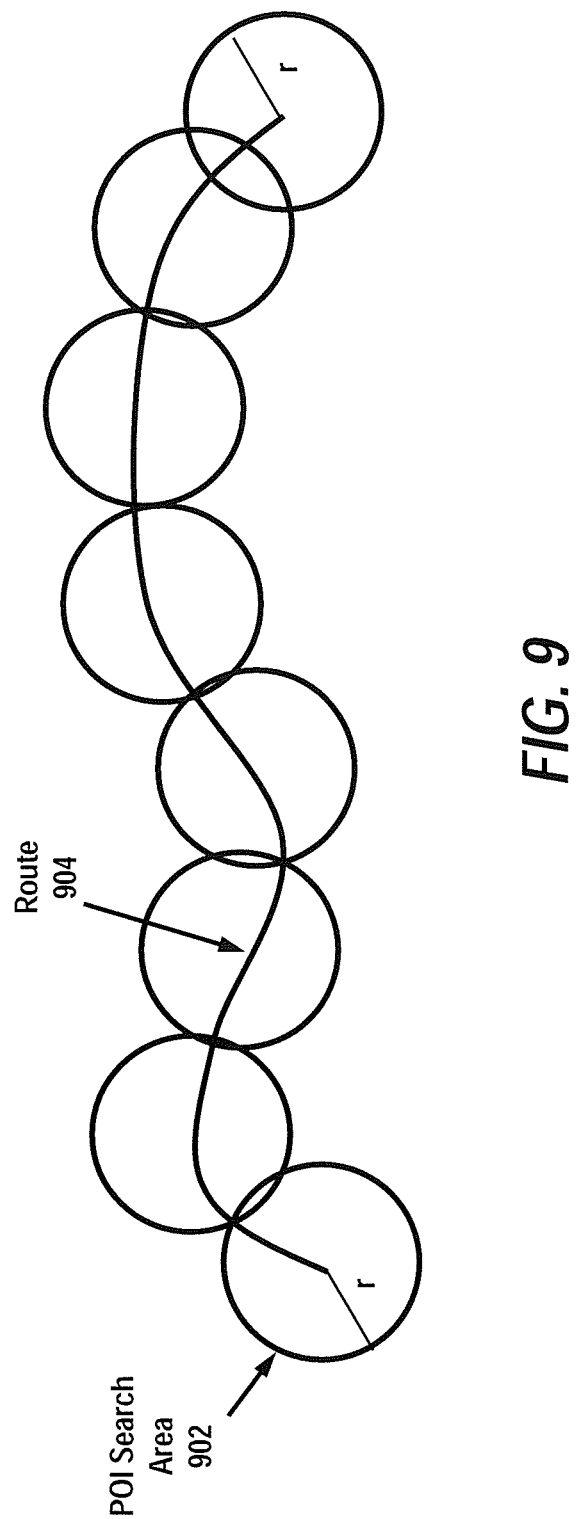
FIG. 9 shows a POI search area arrangement for a route under an illustrative embodiment, where sequential POI search areas are positioned along the route.
Figure 12:
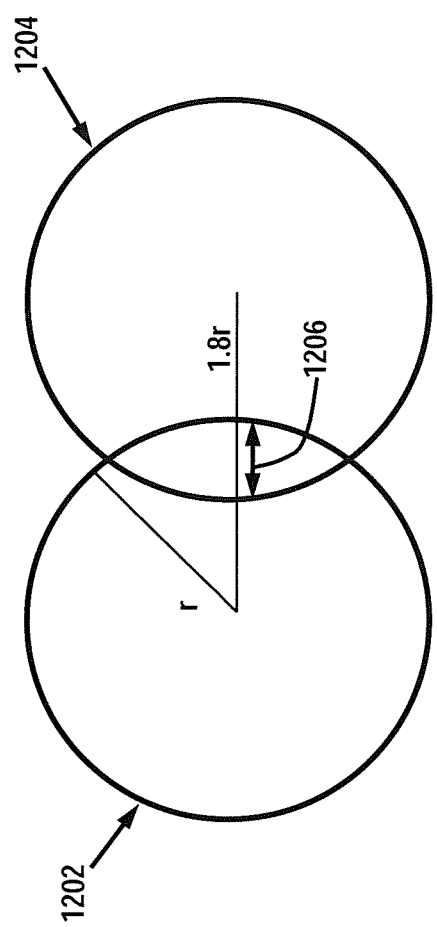
FIG. 12 shows an illustrative embodiment of overlapping POI search areas.

FIG. 9 is an embodiment illustrating POI search areas as they are defined, for example, by search area adjustment tools 714, 814 and applied to a navigation route 904. Each POI search area 902 may be defined by a radius r, where a plurality of search areas 902 may be sequentially arranged along the route 904 in an overlapping or non-overlapping manner. In some embodiments, search areas 902 may be arranged in a non-overlapping manner by arranging center points for the search radius to be a 2r distance away from each other. Turning briefly to the illustrative embodiment of FIG. 12, search areas 1202 and 1204 are configured to overlap by placing search area 1202 a distance of 1.8r away from 1204, resulting in a 0.2r overlap in portion 1206.

Figure 10:
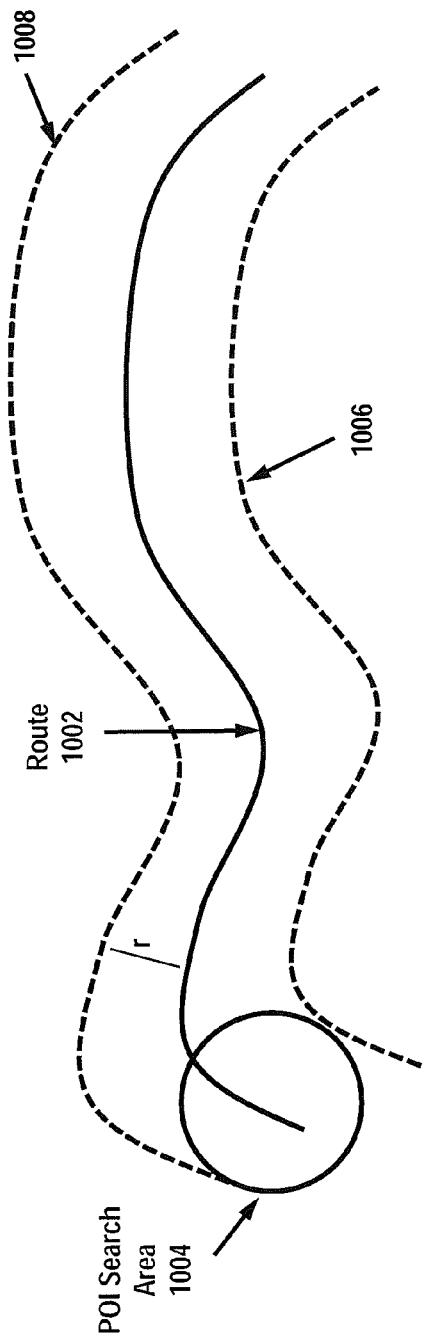
FIG. 10 shows another POI search area arrangement for a route under an illustrative embodiment, where POI search areas are positioned to cover a substantially uniform distance along the route.

Turning now to FIG. 10, an illustrative embodiment is shown for arranging a POI search area 1004 having a radius r to cover a substantially continuous boundary defined by 1006 and 1008 along route 1002. This arrangement may be achieved by spacing search areas 1004 from each other by a fraction of the search area radius (e.g., 0.1r-0.3r). While such a configuration may require additional computational resources, the ability to cover substantially continuous boundaries from a route 1002 may provide more comprehensive POI search and clustering results.

Figure 11:
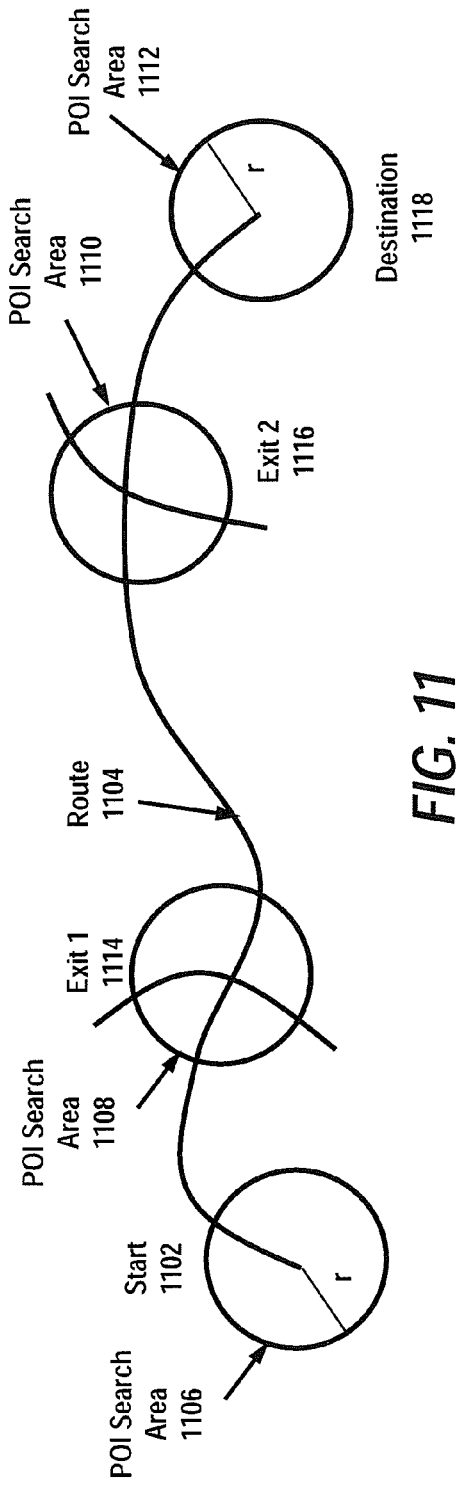
FIG. 11 shows yet another POI search area arrangement for a route under an illustrative embodiment, where POI search areas are positioned to cover detected exit points along the route.

FIG. 11 shows another illustrative embodiment where POI search areas 1106-1112, each having a radius r are automatically focused on a navigation start point 1102, a navigation destination 1118, at a first exit 1114 and a second exit 1116. For navigational trips that involve highway travel, many POIs may be located near exits (1114, 1116). By focusing search areas near highway exit areas, a POI cluster search may be conducted utilizing minimal computing overhead.

Figure 13:
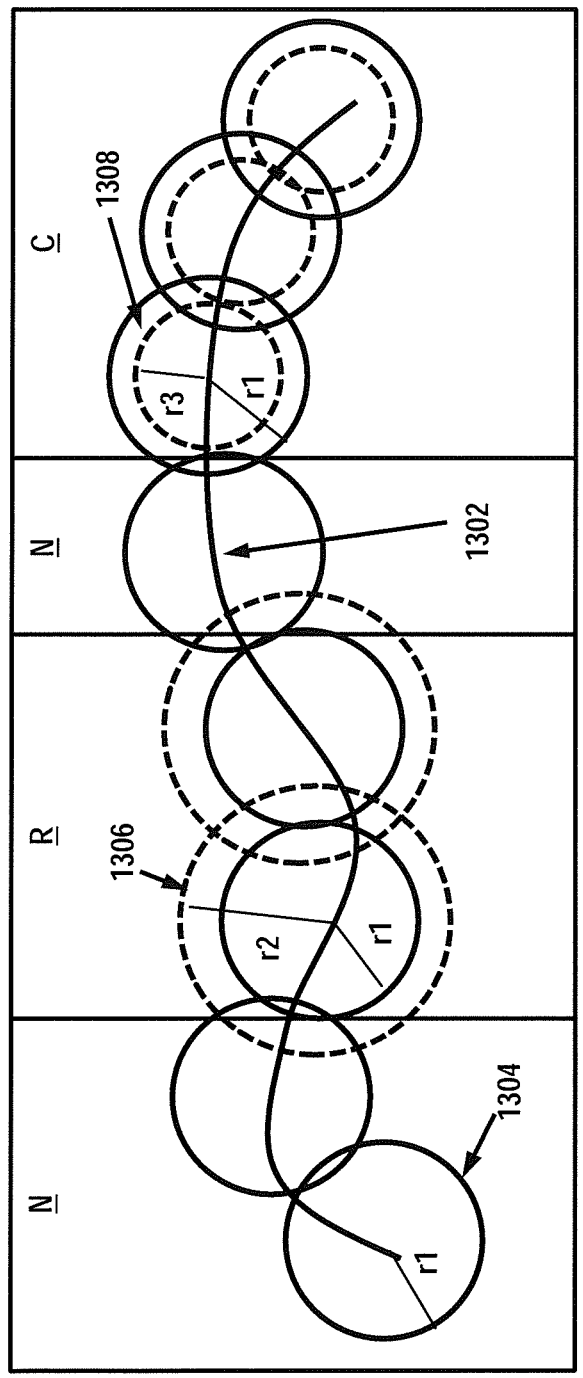
FIG. 13 shows an illustrative embodiment of adjustable POI search areas, wherein a search area may be contracted or expanded along a route depending on certain characteristics existing in a map or specified by a user.

Turning now to FIG. 13, an illustrative embodiment is shown for applying dynamically adjustable POI search areas. As disclosed above, fixed POI search areas may be specified by a user for searching and clustering POIs. While various disclosed embodiments using fixed search areas may advantageously search and cluster POIs, there may be instances where dynamically adjusting the search area may provide more desirable results for a user. In the example of FIG. 3, a route 1302 is disclosed through a navigational map area, where the navigational map area may be partitioned into a plurality of classifications, including "normal" (N), "rural" (R) and "city" (C). Of course, it should be understood that numerous other types and numbers of classifications may be used. Furthermore, while the classification areas are depicted as square areas, people skilled in the art should appreciate that any shape may be used to define such areas. As can be seen from the figure, a normal classification map area results in a fixed POI search area 1304 having radius r1 used for the POI search.

As the route 1302 passes through rural (R) area of the map, the POI search area is automatically expanded to 1306 having an expanded radius r2. The expanded radius 1306 is used to compensate for a reduced number of POIs that are known to exist in a sparsely-populated POI area such as rural area R. By expanding the POI search area to 1306, the system will have greater opportunities to locate and cluster POIs that otherwise may not have been detected. The expanded radius 1306 is used through rural classification area R, until a user's route passes through normal classification area N, at which point the POI search area reverts back to POI search area having radius r1. Continuing further along route 1302, a user may pass through a city classification area (C), at which point the POI search area radius 1308 is contracted to r3 to compensate for an increase number of POIs that are known to exist in a densely-populated POI area. By contracting the POI search area to 1308, the system may simplify the POI searching and clustering process while maintaining optimal navigation routes.

The delta for the expanding and/or contracting of the radius of the POI search area may be predetermined in the navigational system. For example, the navigational system may automatically set a delta of 33% for rural (R) areas, so that when a user passes from a normal (N) route to a rural (R) route are, the POI search area automatically expands by 33%. A similar configuration may be implemented for city (C) areas, so that when a user passes from a normal (N) route to a city (C) route the POI search area automatically contracts by 33%. In other words, the delta may comprise a delta value that is added or subtracted to the POI search area to expand or contract the POI search area.

In other illustrative embodiments, the level of expansion and contraction (delta) may be set to different values. In further illustrative embodiments, users may specify (e.g., via data entry module 750) the delta which is desired. Furthermore, utilizing the POI search area overlap features discussed above, the overlap of POI search areas may automatically be adjusted using algorithms to compensate for a delta in an expanded and/or contracted POI search area. For example, an increase in a POI search area expansion delta (e.g., for rural (R) search area) may automatically adjust adjacent search area overlap by increasing the search area overlap distances, resulting in a rearranged and optimized search area arrangement. Such a configuration may advantageously maintain a comprehensive (i.e., with minimal "gaps") POI search area arrangement while saving processing resources by not requiring a navigation system to redundantly search excessively overlapping areas. Similarly, in another example, a decrease in a POI search area expansion delta (e.g., for city (C) areas) may automatically adjust adjacent search area overlap by decreasing the search area overlap distances, resulting in a rearranged and optimized search area arrangement. By automatically rearranging the POI search area to be closer together, such a configuration may advantageously minimize search area gaps resulting from a reduced POI search area and maintain comprehensive POI search area coverage.

In further illustrative embodiments, the POI search area delta may be algorithmically tied to the types and the number of POI entries (e.g., entries 708A-708C for data entry module 750) to capture an optimum number of POIs for clustering. For example, if a user entered 5 POI entries for a specific area, and a navigational system search obtains only 3 of the 5 entries, the navigational system may automatically expand the POI search area delta to determine if the missing entries may be located. Similarly, if a user entered 3 POI entries for a specific area, and a navigational system search obtains 20 results, the navigational system may automatically contract the POI search are to filter out POIs while maintaining an optimal POI route (i.e., locating POIs that are closest within the POI search area). Additionally, the delta for POI search areas may be saved in a navigational system, so that subsequent searches may utilize the deltas for more efficient processing.

It can be appreciated by those skilled in the art that multiple features and advantages are provided in the various configurations and that further configurations are contemplated in the present disclosure. For example, instances a POI area search only finds a portion POIs and a next search area contains the remaining POT, the two POI areas may be combined and arranged as a new cluster. In another example, a user slide through search results (e.g., using a toggle button 720 or data entry module 750) from the start to the destination to override the optimization algorithms and select desired POI location results despite the fact that the POI locations are not an optimal distance. Such a configuration allows a user to customize clustering in situations where a short route or a narrow search area is used, or where an insufficient number of POIs exist within a reasonable search distance. The POI navigation techniques disclosed herein may further consider hours of operation, so that average stop times at POIs may be calculated to generate further navigational instruction (e.g., "Warning: stopping at bookstore X may prevent you from visiting supermarket Y, which closes at 9:00").

In other illustrative embodiments, the POIs of the navigation system may be tied into a promotional system and/or social media (e.g., embodied within server 205 or other server(s) tied to network 204) to allow a navigational system to provide personal advertisements and information. For example, a user may enter a coffee shop, a bank and a post office POI on a route. In response, the system returns an optimal search result and a first POI cluster for the user (e.g., Starbucks, Bank of California and US Postal Service). Additionally, any special online advertisements may be provided for the user that may relate to the specific POI cluster, or to related entities appearing within the cluster. Thus, as an example, a user may be presented with a notification of a promotional special, sale or coupon related to POI cluster entity Starbucks.

In addition or alternately, promotional specials, sales or coupons for competitors (e.g., Peet's Coffee) or related entities (e.g., Einstein Bagel) may be presented to entice a user to vary from the initial POI cluster. The promotional material may be algorithmically linked to the mapping and clustering to allow a user to change the POI map arrangement in substantially real time. For example, a user's POI preference may be for Starbucks coffee. However, a competing entity may entice the user by providing promotional content to the user, with an option to change the existing POI cluster (e.g., "Stop in to Peet's Coffee (only +0.8 miles further) to try a free cup of the Breakfast Blend! Click <here> to enter Peet's Coffee into your system"). By making the selection, the navigational system automatically replaces the Starbucks entry with the Peet's Coffee entry and recalculates the POI cluster. Similarly, related entities may be automatically added to existing POIs as well (e.g., "Einstein Bagel (−0.3 miles from Starbucks) introduces its new breakfast bagel! Click <here> to add Einstein Bagel to your system"). Of course, users may select in the system whether or not they want to opt out of specific communications, or eliminate promotional and/or advertising content altogether.

In other embodiments the navigation system learns the user's habits when travelling and may provide future POI suggestions as a result. For example, when travelling more than 1½ hours in the morning during working days, a driver may regularly stop at Starbucks. By detecting such routines, the navigation system may make suggesting to the existing POI cluster (e.g., "Want to additionally stop at Starbucks (+0.9 miles)?"). By making the selection, the navigation system automatically recalculates the POI cluster.

In other embodiments, traffic events (e.g., accidents, congestion) and other navigation-related occurrences may be taken into consideration. For example, if the user wants to travel from Monterey to Petaluma via San Francisco, the navigation system may suggest a requested POI cluster around or past a periphery near San Francisco to reduce travel time due to rush hour congestion. The traffic congestion and/or traffic event, which may be provided by an online service, would therefore be another optimization parameter in the POI algorithm.

In other embodiments, the navigation system may identify the user by a FOB, car key, phone or any other wearable device with an identifying wireless signal (e.g., smart watch, smart glass, tablet, smart wristband etc.). The navigation system is then able to use any personalized settings or with an online service (e.g. server 205 or other server(s) communicatively coupled to network 204) to provide personalized advertisement, which may include the recent search history of the specific user. If the user was searching a specific CD music album recently on the Internet, the online service may be able to provide a related offer (e.g., "Best Buy in town XY offers the CD: " . . . " for $9.99. Do you want to include Best Buy, in XY as one of your POIs? (+2.4 miles)").

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A navigation system, comprising:
a processor;
a sensor, operatively coupled to the processor, the sensor being configured to determine a location of the navigation system; and
a navigation input module, operatively coupled to the processor, wherein the navigation input module is configured to receive destination data specifying a destination and a plurality of point-of-interest (PPOI) data specifying a plurality of different types of points-of-interest from a user, wherein the navigation input module is further configured to receive a POI search area value defining an area of search for the PPOI data from potential route segments;
wherein the processor utilizes the POI search area value to search a plurality of areas along the potential route segments to identify PPOI that are in closest proximity to the destination based on the PPOI data that are in closest proximity to the destination,
and wherein the processor is further configured to cluster the identified PPOI data for simultaneous presentation on a navigational map.

2. The navigation system of claim 1, wherein the POI search area value comprises a limited area of search from a route segment.

3. The navigation system of claim 2, wherein the limited area of search comprises one or more distances extending radially around a point on the route segment.

4. The navigation system of claim 2 wherein the limited area of search comprises a radius of search extending radially around a point on the route segment.

5. The navigation system of claim 1, wherein the processor is configured to search the plurality of areas along potential route segments by searching adjacent POI areas of search in one of an overlapping and non-overlapping manner.

6. The navigation system of claim 1, wherein the processor is configured to identify an exit along the potential route segment and search the identified exit using the POI search area value.

7. The navigation system of claim 1, wherein the PPOI data comprises generic POIs and specific POIs that are associated with one or more generic POIs, and wherein the processor is configured to cluster at least one of a plurality of generic and specific POIs.

8. The navigation system of claim 1, wherein the navigation input module is configured to receive a POI search focus value for defining a focus area relative to the destination in which the processor searches the plurality of areas along the potential route segments.

9. The navigation system of claim 1, wherein the processor is configured to dynamically expand or contract the area of search for the PPOI data in accordance with a delta that is added or subtracted to the POI search area value.

10. A method for searching and clustering points-of-interest (POI) in a navigation system, comprising:
determining a location of a navigation system in a navigation system sensor;
receiving, in a navigation input module operatively coupled to a processor of the navigation system, destination data specifying a destination and a plurality of point-of-interest (PPOI) data specifying a plurality of different types of points-of-interest from a user;
receiving, in the navigation input module, a POI search area value defining an area of search for the PPOI data along potential route segments;
searching a plurality of areas along the potential route segments utilizing the POI search area value in the navigation system to identify PPOI that are in closest proximity to the destination based on the PPOI data that are in closest proximity to the destination; and
clustering the identified PPOI data for simultaneous presentation on a navigational map.

11. The method of claim 10, wherein the POI search area value comprises a limited area of search from a route segment.

12. The method of claim 11, wherein the limited area of search comprises one or more distances extending radially around a point on the route segment.

13. The method of claim 11 wherein the limited area of search comprises a radius of search extending radially around a point on the route segment.

14. The method of claim 10, wherein searching a plurality of areas along the potential route segments comprises searching adjacent POI areas of search in one of an overlapping and non-overlapping manner.

15. The method of claim 10, further comprising identifying an exit along the potential route segment and search the identified exit using the POI search area value.

16. The method of claim 10, wherein the PPOI data comprises generic POIs and specific POIs that are associated with one or more generic POIs, and wherein the processor is configured to cluster at least one of a plurality of generic and specific POIs.

17. The method of claim 10, further comprising receiving a POI search focus value in the navigation input module for defining a focus area relative to the destination in which the processor searches the plurality of areas along the potential route segments.

18. The method of claim 10, further comprising dynamically expanding or contracting the area of search for the PPOI data in the processor in accordance with a delta that is added or subtracted to the POI search area value.

19. A navigation system, comprising:
a processor;
a sensor, operatively coupled to the processor, the sensor being configured to determine a location of the navigation system; and
a navigation input module, operatively coupled to the processor, wherein the navigation input module is configured to receive destination data specifying a destination and a plurality of point-of-interest (PPOI) data specifying a plurality of different types of points-of-interest from a user, wherein the navigation input module is further configured to receive a POI search area value defining an area of search for the PPOI data from potential route segments;
wherein the processor utilizes the POI search area value to search a plurality of areas along the potential route segments to identify PPOI that are in closest proximity to the destination based on the PPOI data that are in closest proximity to the destination,
and wherein the processor is further configured to cluster the identified PPOI data for simultaneous presentation on a navigational map,
and wherein the processor is further configured to generate a route from the location of the navigation system, the destination and at least one of the POIs in the navigational map based on at least one of speed and distance.

20. The navigation system of claim 19, wherein the PPOI data comprises generic POIs and specific POIs that are associated with one or more generic POIs, and wherein the processor is configured to cluster at least one of a plurality of generic and specific POIs.

* * * * *